United States Patent

[11] 3,601,513

| [72] | Inventor | Hollis N. White, Jr.<br>Lafayette, Ind. |
|---|---|---|
| [21] | Appl. No. | 843,611 |
| [22] | Filed | July 22, 1969 |
| [45] | Patented | Aug. 24, 1971 |
| [73] | Assignee | TRW Inc.<br>Cleveland, Ohio |

[54] HYDRAULIC DEVICE
13 Claims, 6 Drawing Figs.

[52] U.S. Cl. ........................................... 418/61,
418/179
[51] Int. Cl. ........................................... F01c 1/02,
F04c 1/02, F01c 21/10
[50] Field of Search ........................................... 418/61,
179, 54, 56, 96, 270, 152; 103/130, 126 A, 126 M,
216 M; 230/145; 91/56; 123/8 PN

[56] References Cited
UNITED STATES PATENTS

| 2,291,354 | 7/1942 | Sibley | 103/126 A |
| 3,139,835 | 7/1964 | Wilkinson | 103/130 |
| 3,198,127 | 8/1965 | Brundage | 103/126 A |
| 3,289,602 | 12/1966 | Hudgens | 103/130 |
| 3,427,983 | 2/1969 | Brundage | 103/126 A |
| 3,446,021 | 5/1969 | Lech | 103/130 |

*Primary Examiner*—William L. Freeh
*Assistant Examiner*—John J. Vrablik
*Attorney*—Hill, Sherman, Meroni, Gross & Simpson ABSTRACT: A hydraulic device of the type having inner and outer toothed or lobed members of a gerotor gearset which rotate and orbit relative to one another to provide continually expanding and contracting fluid-pumping chambers or pockets therebetween. The inner toothed member is made of sintered iron. A casing surrounds the inner toothed member in radially spaced relation thereto to provide an annular chamber which is hydraulically pressurized to impose a hydraulic compressive hoop stress on the inner toothed member. A metal sleeve is also pressed on the inner toothed member to impose a mechanical compressive hoop stress thereon.

INVENTOR
HOLLIS N. WHITE, JR.

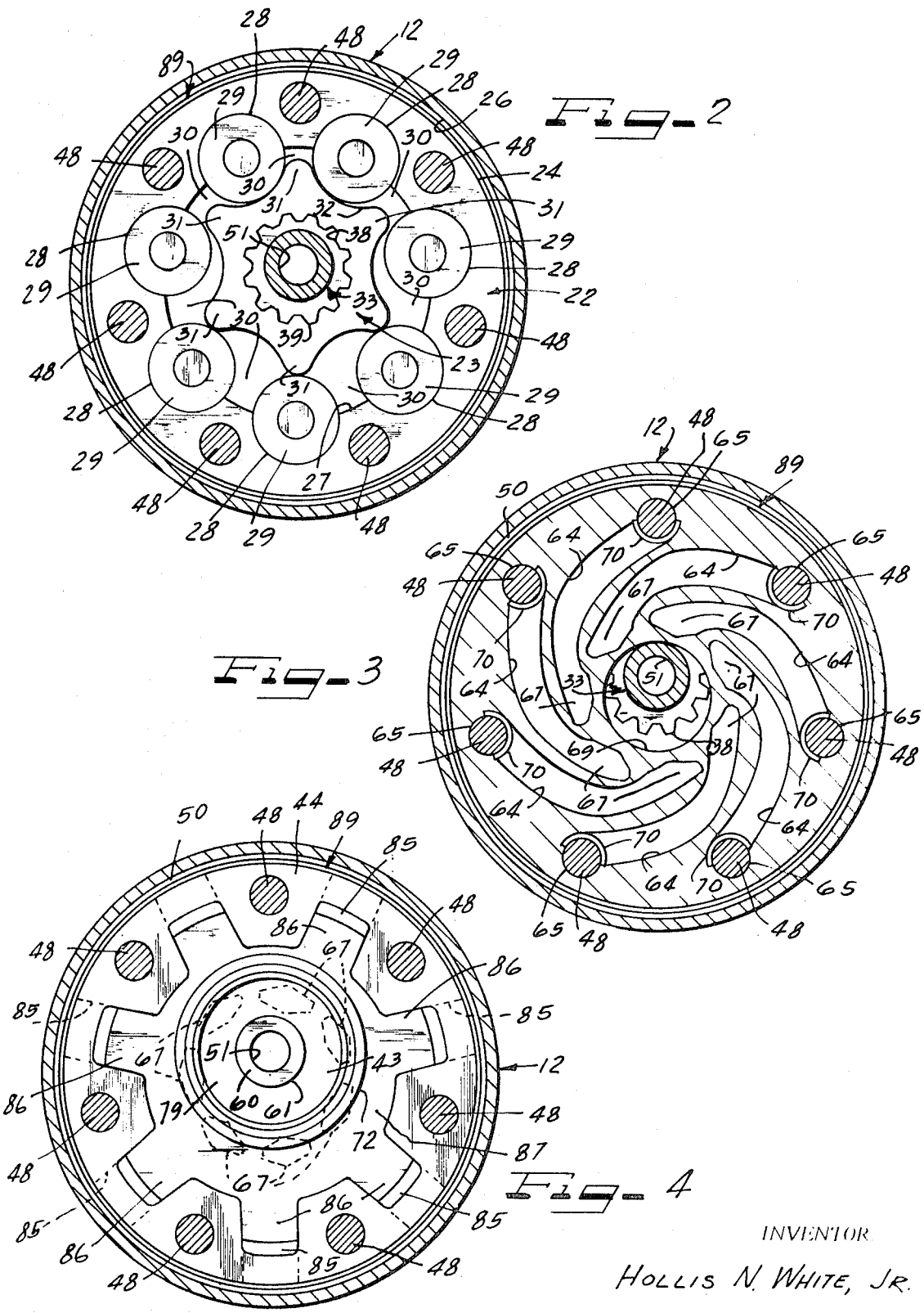

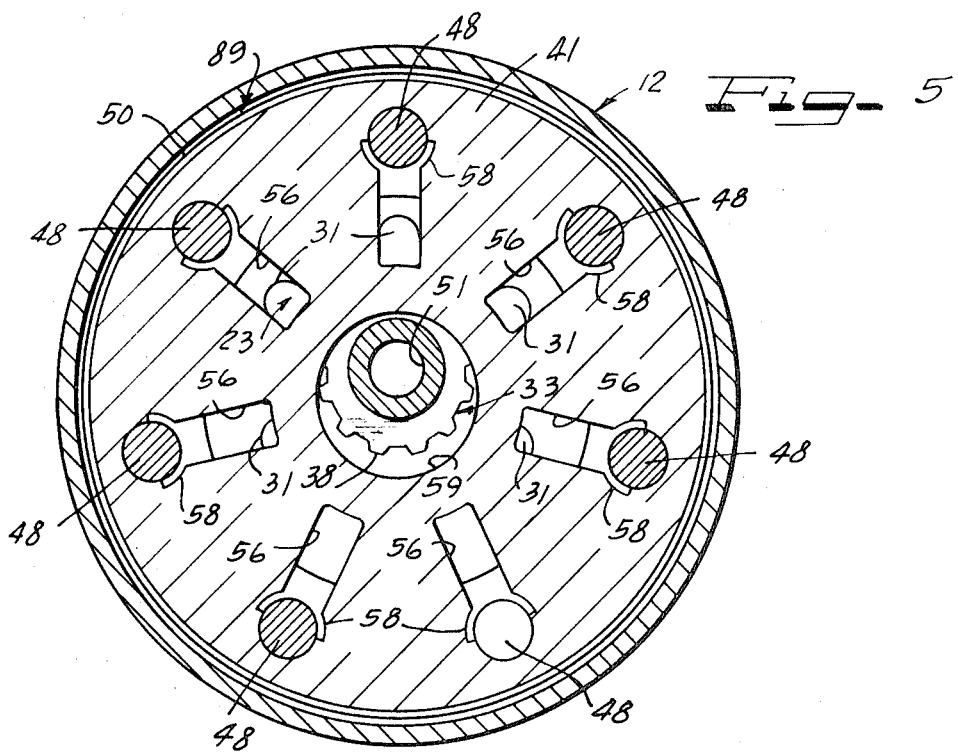
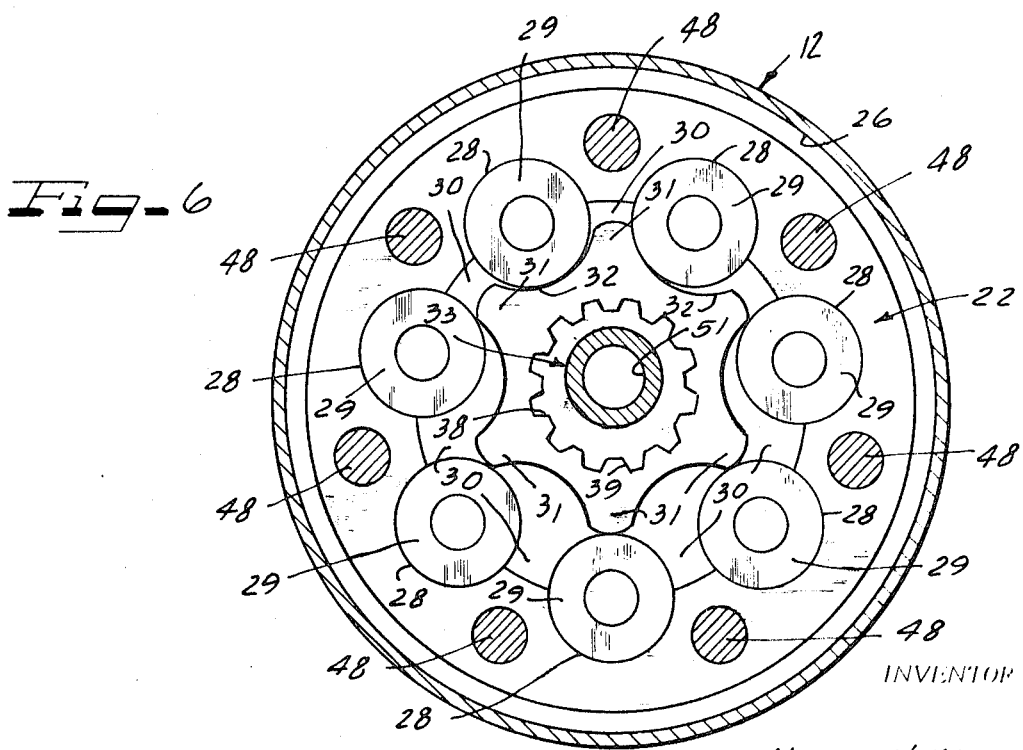

HYDRAULIC DEVICE

BACKGROUND OF THE INVENTION

This invention relates generally to hydraulic devices operable as motors and as pumps and more particularly such devices incorporating a gerotor gearset comprising an internally toothed member and an externally toothed member disposed within the internally toothed member and in meshing engagement therewith so that during operation of the device the toothed members simultaneously rotate and orbit relative to one another to form alternately expanding and contracting fluid chambers or pockets between the teeth thereof. Generally the internally toothed member, referred to herein as a stator, has one tooth more than does the externally toothed member, referred to herein as a rotor or star member. A work input/output shaft is rotatably interconnected to one of the members. The shaft serves to operate the members, if the hydraulic device is being used as a hydraulic pump, or to provide a power takeoff form the device, if the device is being used as a hydraulic motor.

The general overall configuration and construction of an exemplary hydraulic motor-pump device employing a gerotor gearset is disclosed in Hudgens U.S. Pat. No. 3,289,602. In that patent the teeth of the stator are formed of tubular vanes lodged in complementarily shaped recesses formed in an annular ring.

Regardless of the construction of the teeth on vanes, however, the maximum hydraulic pressure under which the stator can safely operate depends upon the structural strength and integrity of the stator.

It is therefore desirable to provide a high-strength stator to accommodate a wide range of fluid pressures. It is also desirable to minimize production costs of all of the various components of the hydraulic device, to the greatest extent practical, and this includes the stator member of the gearset.

High-strength stators may be formed of wrought or cast iron but the use of such materials requires expensive machining operations. On the other hand, it has been determined that the use of a sintered iron process for forming the stator reduces the production costs, since machining is entirely eliminated or greatly reduced, but the structural strength of a stator so formed is generally not sufficient accommodate the high hydraulic pressures which are being utilized more and more frequently in a variety of applications.

The present invention has for an object an increase in the strength of the stator with a decrease in the production cost thereof. A more specific object of the invention is to realize the reduced manufacturing costs inherent in the utilization of sintered iron in the manufacture of stators. Another object is to increase the structural strength of stators made of sintered iron to enable them to be used in high fluid pressure applications.

SUMMARY OF THE INVENTION

With the foregoing objects in mind the present invention may be summarized as comprising a hydraulic motor/pump utilizing a gerotor gearset in which a pressurized fluid chamber surrounds the stator to impose a compressive hoop stress on the stator and, as a result, to increase the structural strength and integrity of the stator and to increase the maximum fluid pressure at which the device can be safely operated.

The invention also contemplates the utilization of means for mechanically (as contrasted with hydraulically) subjecting the stator to a compressive hoop stress such as, for example, a metal band strapped under tension around the periphery of the stator. Both the hydraulic and mechanical stress-imposing means may, of course, be used simultaneously in a single application.

Many other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure.

BRIEF DESCRIPTION OF THE DRAWING

FIGS. 2-5 are sectional view taken along line II—II; III—III; IV—IV and V—V, respectively, of FIG. 1.

FIG. 6 is similar to FIG. 2, but omits the metal band mounted on the stator and relies only upon hydraulic pressure to impose the compressive hoop stress on the stator.

DESCRIPTION OF THE PREFERRED EMBODIMENT

Figure 1:
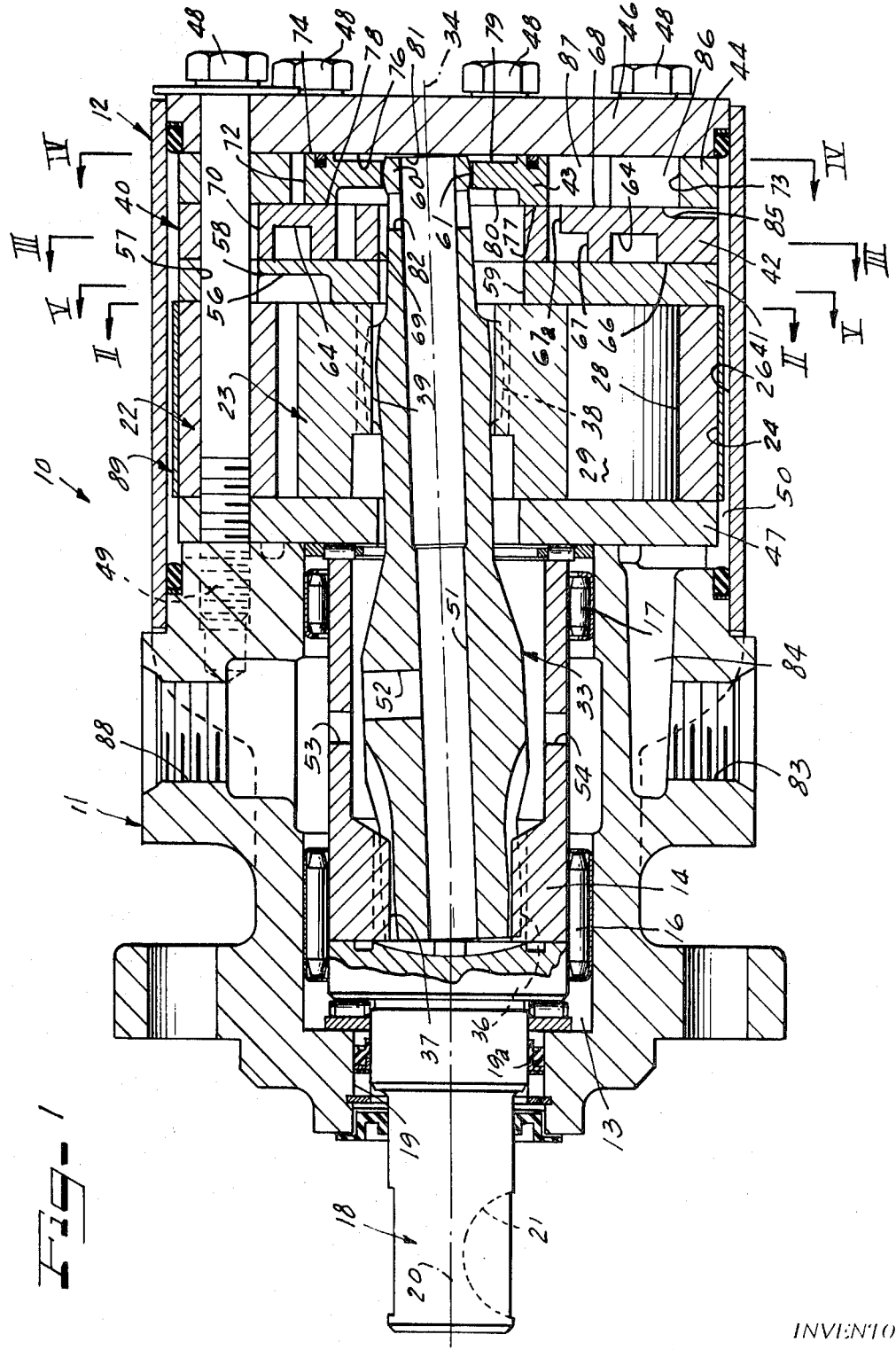
FIG. 1 is a vertical sectional view of a gerotor motor-pump unit constructed in accordance with the principles of the present invention.

Referring to FIGS. 1-5, a hydraulic motor-pump unit or device constructed in accordance with the principles of the present invention is indicated generally at reference numeral 10 and comprises a body 11 and a tubular casing 12 extending from the body 11.

A generally cylindrical chamber 13 is formed within the body 11 and houses a tubular drive sleeve 14 journaled for rotation on a pair of bearing members 16 and 17 spaced axially along the length of the drive sleeve 14. A work input-output shaft 18 extends through an opening 19 of the body 11 provided with suitable bearing and seal members 19a and is connected in fixed assembly to the drive sleeve 14 for joint rotation therewith. The axis of rotation of the input-output shaft 18 is indicated by a dashed line at reference numeral 20. A keyway 21 comprises means for coupling the shaft 18 to a driving member when the hydraulic device 10 is being utilized as a pump and to a driven member when the device unit 10 functions as a hydraulic motor.

Housed within the tubular shell 12 is a gerotor gear set which comprises a pair of fluid displacement members 22 and 23 which cooperate to provide contracting and expanding fluid pockets or chambers and which may be more specifically referred to as an internally toothed or lobed stator and an externally toothed or lobed rotor. As shown in FIGS. 1 and 2, the stator 22 comprises a cylindrical member having a peripheral wall 24 spaced radially inwardly of an inner wall 26 of the shell or casing 12. The stator 22 is centrally apertured to provide an inner wall 27 in which are formed in circumferentially spaced relation a series of axially extending recesses 28 each of which houses a cylindrical van member 29, which vane members together form the internal teeth or lobes of the stator 22. Spaces indicated at 30 situated between the lobes 29 comprise the fluid pockets or chambers which continually alternately expand and contract as the rotor 23 rotates to admit or exit fluid therefrom.

The rotor 23 is star shaped in radial cross section and comprises a plurality of teeth or lobes 31 which in number equal one less than the number of lobes 29 of the stator 22. Outer wall sections 32 which interconnect pairs of adjacent lobes 31 are shaped to generally correspond with the outer surfaces of the lobes 29.

The axis of the rotor 23 is offset with respect to the axis of the stator 22 such that movement of the rotor 23 with respect to the stator 22 is essentially hypocycloidal that is, possessing both rotary and orbital components, as will be understood by those skilled in the art.

The rotor 23 is rotatably interconnected with the drive sleeve 14 by means of an amplifying shaft part or wobble shaft 33 which has an axis of rotation indicated by the dashed lines at reference numeral 34 and disposed at an angle to the axis of the input-output shaft 18. The wobble shaft 33 has a splined axial portion 36 connected to a complementarily splined bore 37 of the drive sleeve 14 for joint rotation therewith and is also splined at another portion 38 to a bore 39 of the rotor 23. The splines at portions 36 and 38 are curved slightly to permit limited universal pivotal movement of the shaft 33 with respect to the drive sleeve 14 and the rotor 23.

In order to direct fluid to and from the fluid pockets 30 in timed relation to the orbital and rotational movement of the rotor 23 with respect to the stator 22 the unit 10 includes a commutation valving arrangement indicated generally at reference numeral 40. More specifically the arrangement 40 comprises a pair of stationary valve plates 41 and 42 which may be referred to respectively as an intermediate plate and a manifold plate. The valving arrangement 40 also includes means providing commutation porting comprising a movable commutator valve plate 43. The commutator valve plate 43 is radially surrounded by a plate 44 situated between a cover plate 46 and the manifold plate 42, and plate 41 is situated between the stator and rotor 22 and 23 on one side and the manifold plate 42 on the other side. A clamping plate 47 is disposed on one side of the stator 22 and the rotor 23 and plates 41, 42, 44 and 47 are clamped in assembled relation by means of a plurality of threaded clamping bolts 48 which extend through registered bores formed in the respective plates and which are threaded into the body 11 of the unit 10 as indicated at reference numeral 49.

Plates 41, 42, 44 and 47 are circularly shaped in vertical cross section and have diameters substantially equal to the diameter of the outer wall 24 of the stator 22, thereby providing an axially extending annular fluid flow passageway 50 along the inside wall 26 of the casing 12 between plates 47 and 44. Other flow passageways are provided in bores 51 and 52 formed in the wobble shaft 33 and in bores 53 and 54 formed in the drive sleeve 14.

In other to understand the operation of the valving arrangement 40 it is necessary to understand various relationships between certain flow passageways formed in the stationary plates 41 and 42 and the commutator valve plate 43. Referring to FIG. 5, the stationary plate 41 situated immediately adjacent the stator 22 has formed therein a plurality of radial flow passageways 56. The passageways 56 correspond in number to the number of fluid chambers 30 formed between the lobes 29 of the stator 22 as well as to the number of clamping bolts 48 which extend axially therethrough in a corresponding number of circumferentially spaced bolt-receiving axial bores 57. Each of the passageways 56 openly communicates with its corresponding bore 57 and each of the bores 57 is oversized at a radially inner segment as indicated at reference numeral 58. The plate 41 is also centrally apertured as at 59 to receive the wobble shaft 33, a forward or nose portion 60 of which reaches to the cover plate 46 and is received in a central bore 61 formed in the commutator 43.

As further illustrated in FIG. 5, the passageways 56 formed in the plate 41 extend radially inwardly of the inner wall 27 of the stator 22 such that the pockets or fluid chambers 30 formed between the lobe 29 of the stator 22 are in open fluid communication therewith.

Referring to FIG. 3, the manifold plate 42 also has a series of circumferentially spaced axial bores formed therein to receive the shanks of the clamping bolts 48, such bores being indicated at reference numerals 65. In addition a plurality of doglegged grooves 64 are formed in a radial face 66 and extend in a curved but radially inwardly bent direction from a corresponding bore 60 to a distal end 67 which communicates with an axial passage 67a of limited cross-sectional area to an opposite face 68 of the plate 42. As illustrated, the passages 67a are disposed in a circular pattern around a concentric bore 69 extending axially through the plate 42 to receive the wobble shaft 33. It is further noted that a radial inner portion 70 of each of the bores 65 is enlarged to provide an axial flow path surrounding a portion of the circumference of the clamping bolts 48.

Referring to FIGS. 1 and 4, the commutator valve plate 43 is formed in the shape of a disc and includes a cylindrical peripheral wall 72 having a diameter substantially less than the diameter of an inner wall 73 of the plate 44 in which it resides. One radial face 74 of the commutator 43 slidingly engages an inner radial wall 76 of the cover plate 46 whereas an opposite radial face 77 thereof slidingly engages a radial face 78 of the manifold plate 42.

As illustrated, a centrally disposed recess 79 is formed in the commutator valve plate face 74 in surrounding relation to the bore 61, and another recess 80 is formed in face 77. The recess 79 is in communication with the axial bore 51 formed in the wobble shaft 33 since a forward wall 81 of the wobble shaft 33 is angularly disposed with respect to the inner wall 76 of the cover plate 46. Recess 80 is also in communication with the bore 51 of the wobble shaft 33 through radial passages 82 extending through the shaft 33.

As previously mentioned, whether the hydraulic device 10 is operating as a hydraulic pump or motor the valving arrangement 40 which includes the commutator valve plate 43 plays a vital role in directing the fluid into and out of the volumetrically varying fluid chambers 30 in timed relation to the hypocycloidal movement of the rotor 23 with respect to the stator 22.

OPERATION

Since the hydraulic device 10 is capable of functioning either as a pump or motor, the interaction of the parts thereof will be described herein during operation of the device as a motor only, since in operating as a pump the interaction of parts in just the opposite of that which obtains when the unit functions as a motor.

Thus in the ensuing description it will be assumed that the hydraulic device 10 is functioning as a hydraulic motor to rotate the work input-output shaft 18. A source of pressurized fluid is connected to an opening 83 formed in the body 11 from which it passes to a chamber 84 into the flow passageway 50 situated immediately interiorly of and adjacent to the wall 26 of the casing 12. The pressurized fluid then flows through radially overlapping angularly spaced grooves 85 and 86 formed respectively in faces 68 and 77 of the plates 42 and 44 and into a chamber 87 surrounding the commutator 43.

Regardless of the position of the commutator 43, at least one of the flow passageways 67 formed in the manifold plate 42 communicates with the chamber 87 and directs the pressurized fluid through its respective dog legged passageways 64 to the flow passageways 71 communicating therewith. The pressurized fluid is then communicated into the flow passageway 65 formed in plate 41 in register with the pressurized passageway 71 and thence into a fluid chamber or pocket 30 formed between the lobes 29 of the stator 22. Pressurization of one or more of the fluid chambers 30 in any position of the rotor 23 imparts a rotating force to the rotor in one direction of rotation, such direction being counterclockwise in FIG. 2 when the opening 83 is connected to a source of pressurized fluid and the unit 10 is functioning as a hydraulic motor.

Each of the fluid chambers 30 in communication with the pressurized fluid expands in size because of the simultaneous orbital and rotational movement of the rotor 23 whereas the chambers 30 which are not in communication with the pressurized fluid contract as the lobes 31 of the rotor 23 begin to move into the chambers 30 and force the fluid therefrom.

The fluid in the chambers 30 which are being reduced in size is directed through the radial passages 56 of the intermediate plate 41 which correspond to the contracting chambers and thence through passageways 65 and 71 to the corresponding doglegged passageways 64. The fluid then flows through the associated passages 67 formed at the distal ends of the corresponding passages 64 and thence through the recess 80 formed in the commutator plate 43, bores 82, 51 and 52 formed in the wobble shaft 33, thence through passages 53 and 54 in the drive sleeve 14 and out of the body 11 through an opening 88 situated opposite the opening 83.

As the rotor 23 rotates through an orbital path as a result of the successive pressurization of circumferentially adjacent fluid chambers 30, the wobble shaft 33 is also rotated and, along with the rotor 23, orbits at the orbit speed of the rotor. In the embodiment illustrated the stator 22 has seven lobes whereas the rotor 23 has six and thus for each revolution thereof the rotor 23 will orbit six times. The wobble shaft 33 also orbits at point 38 about the pivotal end or point 36 at the orbiting speed of the rotor 23.

Since the commutator valve plate 43 is coupled to the nose 60 of the wobble shaft 33 it also will be orbited at the orbit speed of the rotor 23. By referring to the drawings it will be noted that the commutator valve plate 43 alternately and sequentially opens and closes the radially angularly adjacent passageways 67 with the fluid-pressurized chamber 87 as it orbits in timed relation to the orbital movement of the rotor 23 whereby the fluid pockets or chambers 30 sequentially and alternately expand under the driving force of the pressurized fluid and then contract to expel the fluid therefrom.

The wobble shaft 33 is coupled to the work input-output shaft 18 and thus rotates shaft 18 at the speed of rotation of the rotor 23. Operation of the unit 10 and rotation of shaft 18 will continue as long as the port 83 of the body 11 is connected to the source of pressurized fluid.

In order to reverse the direction of rotation of the shaft 18 it is only necessary to connect port 88 to the source of pressurized fluid rather than port 83. The pressurized fluid will then flow through the hydraulic device 10 in a direction opposite to that described above, thereby causing the rotor 23 to rotate in a clockwise direction as viewed in FIG. 2. When the unit 10 is utilized as a hydraulic pump the shaft 18 is connected for rotation to any suitable driving motor and fluid will be pumped through the unit 10 between openings 83 and 88 in a direction which depends upon the direction of rotation of the shaft 18.

From the foregoing it will be appreciated that, regardless of whether the hydraulic device 10 is being utilized as a pump or as a motor, the annular chamber or space 50 surrounding the periphery of the stator 22 is always filled with high-pressure fluid in one direction of rotational and orbital movement of the rotor 23 relative to the stator 22 and does in fact serve as a fluid conduit or flow passageway. As a consequence the pressurized fluid in chamber 50 imposes a radially inwardly directed stress on the stator 22, which stress may be conveniently referred to as a compressive hoop stress.

As a result of this hydraulically imposed compressive hoop stress the structural strength and integrity of the stator 22 is increased, and the increase is proportional to the increase in fluid pressure which acts on the stator 22 and rotor 23 to operate the same when the device 10 is serving as a hydraulic motor, or which is developed by the toothed members 22 and 23 when the device 10 is serving as a fluid pump. Thus the magnitude of the radially inwardly directed compressive hoop stress is automatically compensating and varies in accordance with the radially outwardly directed forces acting on the stator.

The hydraulic stress to which the stator 22 is subjected by virtue of the pressurized fluid chamber 50 enables the stator 22 to be constructed of material having less inherent structural strength than would otherwise be possible to safely withstand corresponding operating fluid pressures. In the embodiment illustrated, for example, an annular ring member $22_a$ of the stator 22 is made of sintered iron, and the formation thereof requires little or no machining. While a sintered iron ring member $22_a$ would not generally be capable of withstanding a wide range of operating fluid pressures due to the inherent reduced structural strength thereof the increase in structural strength afforded by the hydraulically developed compressive hoop stress acting thereon enables the sintered iron ring $22_a$ to be utilized in the extremely high fluid pressure ranges now being employed in the operation of hydraulic devices of the gerotor gear type as generally described herein.

In addition to the hydraulically imposed compressive hoop stress, which obtains in one direction of rotation of the rotor 23 relative to the stator 22 the stator 22 may also be subjected to a mechanically imposed stress during rotation of the rotor in an opposite direction. As shown in FIGS. 1 and 2, a circumferentially continuous band 89 is strapped around the peripheral wall 24 of the stator 22 by means of a press fit whereby the band 89 is under substantial tension in its assembled condition. The bank 89 may be made of steel having high tensile strength capabilities so that the compressive hoop stress imposed thereby on the stator ring $22_a$ may be of a high order.

The mechanical stress imposed on the stator 22 by the band 89 augments or supplements the hydraulic stress imposed on the stator 22 by tee pressurized fluid in chamber 50. In many applications the additional stress applied by the band 89 may not be required, depending upon the fluid pressure ranges in which the hydraulic device 10 is to be operated.

Thus, in the embodiment of the stator 22 illustrated in FIG. 6 the band 89 is omitted and the entire compressive hoop stress being applied to the stator 22 results from the pressurization of the fluid chamber 50. Regardless of whether the stator 22 is subjected to either one or both the hydraulically and mechanically imposed compressive hoop stresses, however, the strength of the stator 22 may be increased to a level whereby the economically desirable sintered iron process of formation of the stator ring $22_a$ may be advantageously utilized at high operating fluid pressures.

What I claim is:

1. In a hydraulic device having an internally toothed cylindrical stator, an externally toothed rotor disposed within the stator and movable orbitally and rotationally relatively thereto to provide pressurized fluid pockets between the teeth thereof and a casing surrounding the stator in radially spaced relation thereto to provide an annular chamber therebetween, the improvement of means forming a metal sleeve encircling the stator to place the stator under a mechanically imposed compressive hoop stress ad increase the high fluid pressure capabilites thereof.

2. The invention as defined in claim 1 wherein said stator comprises an annular ring made of sintered iron.

3. The invention as defined in claim 1 wherein said sleeve is made of steel.

4. The invention as defined in claim 1 wherein said sleeve is press fit on said stator.

5. The invention as defined in claim 1 and including means for hydraulically pressurizing said chamber between said sleeve and said casing.

6. A hydraulic device operable as a pump and as a motor comprising
a casing having a chamber formed therewithin,
a gerotor mechanism in said chamber including a stationary internally toothed stator and an externally toothed rotor,
said stator comprising a sintered iron annular ring disposed in spaced relation to said casing and having tubular vanes mounted on the inner periphery thereof to form the teeth of the stator,
said rotor being disposed within said stator and in meshing engagement therewith for orbital and rotational movement relative to said stator during operation of said device to form expanding and contracting fluid pockets between the teeth of said stator,
means forming a pair of pressurized fluid openings in said casing,
means communicating said openings with said pockets in timed relation to the relative movement of said rotor and said stator and including means communicating one of said openings with the space between said casing and said stator to impose a hydraulic compressive hoop stress on said stator.

7. A hydraulic motor-pump device comprising
a casing having a fluid inlet opening,
a fluid outlet opening and a chamber formed therein,
a gerotor mechanism in said chamber including an internally toothed gear member having a peripheral wall and an externally toothed gear member within the internally toothed gear member and disposed in meshing engagement therewith to form alternately expanding and contracting pockets between the teeth of the internally toothed gear member upon operation of said gerotor mechanism, means for providing influx and efflux of fluid into and out of said pockets in timed relation to the relative movement of said internally and externally toothed gear members including a commutator valve plate operatively connected to said gerotor mechanism and fluid passage means communicating said commutator valve plate and said fluid inlet and outlet openings, said fluid passage means including the peripheral wall of said internally toothed gear member whereby a pressurized fluid chamber is provided about the periphery of said internally toothed gear member to impose a hydraulic compressive hoop stress thereon.

8. The invention as defined in claim 7 wherein said internally toothed gear member is imposed stationarily within said chamber.

9. The invention as defined in claim 7 wherein said internally toothed gear member is formed of sintered iron.

10. In a hydraulic device including a gerotor mechanism having an internally toothed cylindrical gear and an externally toothed gear disposed within the internally toothed gear and movable orbitally and rotationally relatively thereto to provide pressurized fluid pockets between the teeth thereof, the improvement of means forming a metal sleeve encircling the internally toothed gear to place the same under a mechanically imposed compressive hoop stress and to increase the high-pressure capabilities thereof.

11. The invention as defined in claim 10 wherein said internally toothed gear is made of sintered iron.

12 A hydraulic device operable as a pump and as a motor comprising a casing having a chamber formed therewithin, a gerotor mechanism in said chamber including a stationary internally toothed stator and an externally toothed rotor, said stator comprising a sintered iron annular ring disposed in spaced relation to said casing and having tubular vanes mounted on the inner periphery thereof to form the teeth of the stator, said rotor being disposed within said stator and in meshing engagement therewith for orbital and rotational movement relative to said stator during operation of said device to form expanding and contracting fluid pockets between the teeth of said stator, means forming a pair of pressurized fluid openings in said casing, means communicating said openings with said pockets in timed relation to the relative movement of said rotor and said stator and including means communicating one of said openings with the space between said casing and said stator to impose a hydraulic compressive hoop stress on said stator, and means forming a metal sleeve strapped under tension around the periphery of said stator to impose a mechanical compressive stress of said stator.

13. A hydraulic motor-pump device comprising a casing having fluid inlet opening, a fluid outlet opening and a chamber formed therein, a gerotor mechanism in said chamber including an internally toothed gear member having a peripheral wall and an externally toothed gear member within the internally toothed gear member and disposed in meshing engagement therewith to form alternately expanding and contracting pockets between the teeth of the internally toothed gear member upon operation of said gerotor mechanism, means for providing influx and efflux of fluid into and out of said pockets in timed relation to the relative movement of said internally and externally toothed gear members including a commutator valve plate operatively connected to said gerotor mechanism and fluid passage means communicating said commutator valve plate and said fluid inlet and outlet openings, said fluid passage means including the peripheral wall of said internally toothed gear member whereby a pressurized fluid chamber is provided about the periphery of said internally toothed gear member to impose a hydraulic compressive hoop stress thereon, and a steel sleeve around the peripheral wall of the internally toothed gear member under tension to impose a mechanical compressive hoop stress on said internally toothed gear member.